United States Patent
Harrison et al.

(10) Patent No.: US 8,490,171 B2
(45) Date of Patent: Jul. 16, 2013

(54) METHOD OF CONFIGURING A SECURITY GATEWAY AND SYSTEM THEREOF

(75) Inventors: Reuven Harrison, Tel Aviv (IL); Yakov Persky, Holon (IL)

(73) Assignee: Tufin Software Technologies Ltd., Ramat Gan (IL)

( * ) Notice: Subject to any disclaimer, the term of this patent is extended or adjusted under 35 U.S.C. 154(b) by 1211 days.

(21) Appl. No.: 12/172,838

(22) Filed: Jul. 14, 2008

(65) Prior Publication Data
US 2010/0011433 A1    Jan. 14, 2010

(51) Int. Cl.
*G06F 9/00*    (2006.01)

(52) U.S. Cl.
USPC .......................................................... 726/12

(58) Field of Classification Search
USPC ..... 726/1, 11, 12, 22; 713/153, 154; 709/220, 709/238
See application file for complete search history.

(56) References Cited

U.S. PATENT DOCUMENTS

| | | | |
|---|---|---|---|
| 6,182,226 B1 | 1/2001 | Reid et al. | |
| 7,032,022 B1 * | 4/2006 | Shanumgam et al. | 709/225 |
| 7,225,255 B2 | 5/2007 | Favier et al. | |
| 7,778,981 B2 * | 8/2010 | Armitano et al. | 707/694 |
| 7,792,860 B2 * | 9/2010 | Shrivastava et al. | 707/786 |
| 7,821,926 B2 * | 10/2010 | Hannel et al. | 370/229 |
| 2002/0188864 A1 * | 12/2002 | Jackson | 713/201 |
| 2004/0103315 A1 * | 5/2004 | Cooper et al. | 713/201 |
| 2005/0193429 A1 * | 9/2005 | Demopoulos et al. | 726/23 |
| 2005/0251570 A1 * | 11/2005 | Heasman et al. | 709/224 |
| 2006/0031472 A1 * | 2/2006 | Rajavelu et al. | 709/224 |
| 2006/0248580 A1 | 11/2006 | Fulp et al. | |
| 2006/0259955 A1 | 11/2006 | Gunther et al. | |
| 2008/0289027 A1 * | 11/2008 | Yariv et al. | 726/11 |
| 2009/0138939 A1 * | 5/2009 | Kumar et al. | 726/1 |

FOREIGN PATENT DOCUMENTS

WO   WO 2006/080930 A1   8/2006

OTHER PUBLICATIONS

Golnabi et al. "Analysis of Firewall Policy Rule Using Data Mining Techniques", KAISAT, CS492 Special Topics: Computer Science and Engineering Research;,NOMS; 2006.
Golnabi, K. et al., "Analysis of Firewall Policy Rules Using Data Mining Techniques," *IEEE*, 2006, pp. 305-315.

* cited by examiner

*Primary Examiner* — Beemnet Dada
(74) *Attorney, Agent, or Firm* — Oliff & Berridge, PLC

(57) ABSTRACT

There is provided a rule-set generator and a method of automated configuration of a security gateway. The method comprises setting-up an initial rule-set; obtaining log records of communication events corresponding to the initial rule-set so as to obtain a sufficient amount of log records; transforming the obtained log records into respective rules, wherein source, destination and service fields in each rule correspond to source, destination and service values in respective obtained log record, and the action in all rules is defined as "Accept", thus giving rise to a transformation-based rule-set; and processing the transformation-based rule-set so as to generate an operable rule-set by processing the transformation-based rule-set.

26 Claims, 4 Drawing Sheets

METHOD OF CONFIGURING A SECURITY GATEWAY AND SYSTEM THEREOF

FIELD OF THE INVENTION

This invention generally relates to network security, and more particularly, to security gateways and methods of operating thereof.

BACKGROUND OF THE INVENTION

Today, information security is one of the critical concerns in computer networks and services. Various methods have been developed for protection of various resources and services; usually these methods include implementation of one or more security policies, combinations and hierarchies thereof. Typically, a security policy includes control of inbound and outbound traffic related to certain resources. Such control is enforced with the help of a security gateway, which may comprise various devices and/or combinations thereof (e.g. switches, routers, firewalls, VPN devices, load balancers, etc.).

However, configuring the security gateway, especially in complex network architecture, presents an increasing challenge to security departments worldwide. The problem has been recognized in the Prior Art and various systems have been developed to provide a solution, for example:

U.S. Pat. No. 6,182,226 (Reid et al.) entitled "System and method for controlling interactions between networks" discloses a firewall used to achieve network separation within a computing system having a plurality of network interfaces. A plurality of regions is defined within the firewall and a set of policies is configured for each of the plurality of regions. The firewall restricts communication to and from each of the plurality of network interfaces in accordance with the set of policies configured for the one of the plurality of regions to which the one of the plurality of network interfaces has been assigned.

U.S. Pat. No. 7,032,022 (Shanumgam et al.) entitled "Statistics aggregation for policy-based network" discloses a unified policy management system for an organization including a central policy server and remotely situated policy enforcers. A central database and policy enforcer databases storing policy settings are configured as LDAP databases adhering to a hierarchical object oriented structure. Changes in the policy settings made at the central policy server are automatically transferred to the policy enforcers for updating their respective databases. Each policy enforcer collects and transmits health and status information in a predefined log format and transmits it to the policy server for efficient monitoring by the policy server. The system also provides for dynamically routed VPNs where VPN membership lists are automatically created and shared with the member policy enforcers. Updates to such membership lists are also automatically transferred to remote VPN clients. The system further provides for fine grain access control of the traffic in the VPN by allowing definition of firewall rules within the VPN.

U.S. Pat. No. 7,225,255 (Favier et al.) entitled "Method and system for to controlling access to network resources using resource groups" encloses a method and device for configuring a firewall in a computer system employing a rule for controlling access between a source resource and a destination resource only if said source and destination resources belong to the same protection domain. At a central configuration machine, an access control rule is specified, including a scope, for each resource group, the scope, and thus the access control rule is capable of being interpreted by each of the plurality of firewalls differently depending on the value of the scope and network resource characteristics associated with each of the plurality of firewalls.

US Patent Application No. 2006/259,955 (Gunther et al.) entitled "Attribute-based allocation of resources to security domains" discloses a method for the optimized assignment of access rights to IT resources managed by means of a security management system and to a correspondingly adapted security management system. According to the invention a security domain is defined on the basis of at least one attribute of IT resources and a plurality of authorization profiles is provided for the security domain. User groups are assigned to the domain and linked to profiles provided for the domain. IT resources for which the security management is responsible are allocated to the domain in accordance with the attribute defining the security domain, as a result of which user groups assigned to the domain receive access rights to the IT resources allocated to the domain in accordance with the profiles linked to them. The invention permits the user groups to be issued with authorizations that are tailored to the requirements of the individual groups.

US Patent Application No. 2006/248,580 (Fulp et al.) entitled "Methods, systems, and computer program products for network firewall policy optimization" discloses a method and system for firewall policy optimization. According to one method, a firewall policy including an ordered list of firewall rules is defined. For each rule, a probability indicating a likelihood of receiving a packet matching the rule is determined. The rules are sorted in order of non-increasing probability in a manner that preserves the firewall policy.

US Patent Application No. 2006/031,472 (Rajavelu et al.) entitled "Network data analysis and characterization model for implementation of secure enclaves within large corporate networks" discloses a database storing information about known hosts, the applications or services they host, and the ports (known as confirmed ports) used by the applications/services. A static traffic analyzer analyzes traffic data and identifies packets communicating with (either sent to or received from) confirmed ports on hosts. A dynamic traffic analyzer analyzes the traffic data and identifies packets communicating with unconfirmed ports on hosts. A host identifier uses the resulting static and dynamic traffic to identify hosts for which firewall rules should be generated.

SUMMARY OF THE INVENTION

Typically, the process of configuring a security gateway includes a process of manual configuration of the rule-set and requires a prior knowledge of IT resources and connectivity requirements. There is a need in the art to provide a new system and method facilitating an automated rule-set creation. The invention, in some of its aspects, is aimed to provide a novel solution facilitating automated configuration of a security gateway with no need for prior knowledge of network resources, topology and connectivity requirements.

In accordance with certain aspects of the present invention, there is provided a method of automated configuration of a security gateway, the method comprising:
  a) setting-up an initial rule-set;
  b) obtaining log records of communication events corresponding to the initial rule-set so as to obtain a sufficient amount of log records;
  c) transforming the obtained log records into respective rules, wherein source, destination and service fields in each rule correspond to source, destination and service values in respective obtained log record, and the action in all rules is defined as "Accept", thus giving rise to a transformation-based rule-set;

d) processing the transformation-based rule-set so as to generate an operable rule-set by processing the transformation-based rule-set.

In accordance with further aspects of the present invention, there is provided a rule-set generator comprising:

a) a first repository configured to accommodate an initial rule-set to be used for configuring a security gateway;

b) a second repository configured to accommodate log records of communication events corresponding to the initial rule-set;

c) a processor operatively coupled to the first repository and the second repository and configured to:

transform said accommodated log records into respective rules, wherein source, destination and service fields in each rule correspond to source, destination and service values in respective log record, and the action in all rules is defined as "Accept", thus giving rise to a transformation-based rule-set; and processing the transformation-based rule-set so as to generate an operable rule-set by processing the transformation-based rule-set.

In accordance with further aspects of the present invention, the initial rule-set may be related to all traffic to be controlled by the security gateway or to a part thereof The initial rule set may comprise only one rule, this rule permitting any traffic between any data network resources or comprise a combination of permissive and restrictive rules. The initial rule-set may be integrated with a pre-configured rule-set, e.g. by adding an "Accept-All-And-Log" rule as a last rule to the pre-configured rule-set.

In accordance with further aspects of the present invention the obtained log records may be generated by the security gateway configured to control at least part of traffic in accordance with said initial rule-set and/or by sniffing the traffic to be controlled by the security gateway and logging respective communication events.

In accordance with further aspects of the present invention, the sufficient amount of log records may be characterized by achieving a certain threshold and/or by terminating a certain substantial collection period.

In accordance with further aspects of the present invention, the processing of transformation-based rule-set comprises:

a) identifying and removing duplicate rules among the transformation-based rules, thus giving rise to remaining rules, wherein each remaining rule is provided with an initial hit count characterizing the number of respective duplicated rules before removing; and b) consolidating the remained rules by source, destination and service respectively, thus giving rise to consolidated rules, wherein each consolidated rule is provided with a consolidated hit count calculated by summarizing the initial hit counts of the rules consolidated in the respective consolidated rule.

In accordance with further aspects of the present invention, the consolidated rule-set may be further optimized by reordering the rules in accordance with their consolidation hit count, wherein the more frequent rules are put higher in a rule table The consolidated rule-set may be also further adjusted according to different criteria, e.g. vulnerability black lists, organizational policies, best practices, recommended white lists, regulations, standards for security gateways, and/or otherwise.

In accordance with further aspects of the present invention, the consolidating may comprise combining a range of IP addresses of respective sources and/or destinations in a sub-network. If the range of IP addresses is non-consecutive, the combining in a sub-network is provided in accordance with a Subnet Threshold Parameter (STM) defined as a ratio of the largest allowable gap in the network IP addresses to a number of addresses in a resulting sub-network, In accordance with further aspects of the present invention, the rule-set generator may further comprise a sniffer operatively coupled to the second repository and capable of capturing network traffic to be controlled by the security gateway and of generating respective log records.

In accordance with further aspects of the present invention, the rule-set generator may be at least partly integrated with the security gateway.

Among advantages of certain aspects of the present invention is decreasing human involvement in the process of initial and on-going configuration of the security gateway, thus enabling substantial error and cost reduction even for large and complex networks.

BRIEF DESCRIPTION OF THE DRAWINGS

In order to understand the invention and to see how it may be carried out in practice, an embodiment will now be described, by way of non-limiting example only, with reference to the accompanying drawings, in which.

DETAILED DESCRIPTION OF EXEMPLARY EMBODIMENTS

Figure 1:
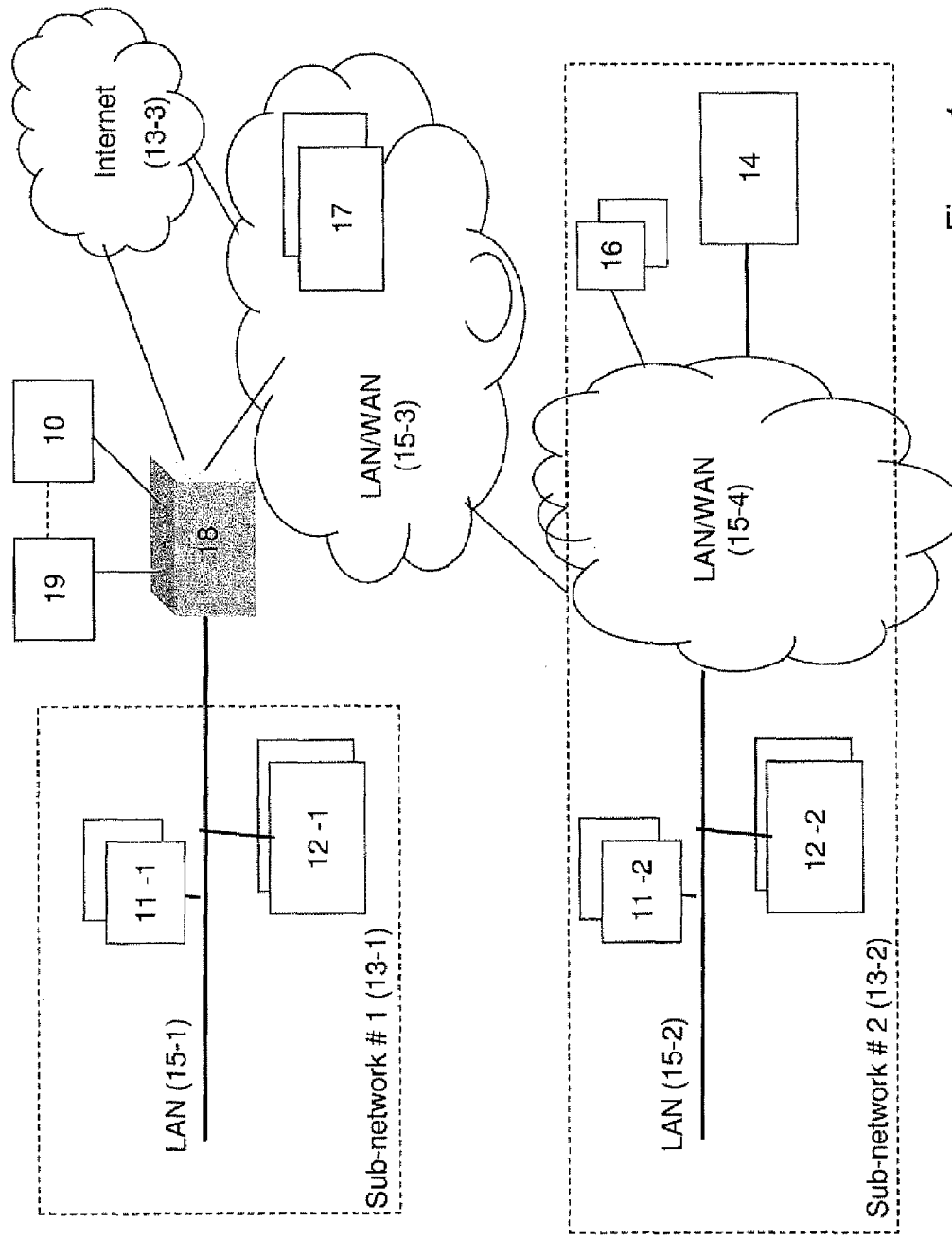
FIG. 1 illustrates a generalized network environment where the present invention may be implemented.

In the following detailed description, numerous specific details are set forth in order to provide a thorough understanding of the invention. However, it will be understood by those skilled in the art, that the present invention may be practiced without these specific details. In other instances, well-known methods, procedures, components and circuits have not been described in detail so as not to obscure the present invention. In the drawings and descriptions, identical reference numerals indicate those components that are common to different embodiments or configurations.

Unless specifically stated otherwise, as apparent from the following discussions, it is appreciated that throughout the specification discussions utilizing terms such as "processing", "computing", "calculating", "determining", "counting", "generating" or the like, refer to the action and/or processes of a computer or computing system, or processor or similar electronic computing device, that manipulate and/or transform data represented as physical, such as electronic, quantities within the computing system's registers and/or memories into other data, similarly represented as physical quantities within the computing system's memories, registers or other such information storage, transmission or display devices.

The processes/devices presented herein are not inherently related to any particular electronic component or other apparatus, unless specifically stated otherwise. Various general purpose components may be used in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

The term "criterion" used in this patent specification should be expansively construed to include any compound criterion, including, for example, several criteria and/or their logical combinations.

The term "configuring a security gateway" used in this patent specification should be expansively construed to include setting up a rule-set for a new security gateway, and/or replacing a pre-configured rule-set or parts thereof; and/or refining the pre-configured rule-set (e.g. for supporting newly added physical and/or logical resources and groups thereof, for on-going maintenance, etc.).

The references cited in the background teach many principles of configuring a security gateway that are applicable to the present invention. Therefore the full contents of these publications are incorporated by reference herein where appropriate for appropriate teachings of additional or alternative details, features and/or technical background.

Bearing the above in mind, attention is drawn to FIG. 1 schematically illustrating an exemplary data network where the present invention may be implemented. The data network comprises a plurality of intranet network resources (e.g. workstations 11-1, 11-2, and/or servers 12-1, 12-2, web-based application server 14, resources associated with mobile users 16, etc.) grouped in sub-networks 13-1 and 13-2. The sub-networks, as well as the resources within the sub-networks, may be operatively coupled via one or more local (15-1, 15-2) or wide area (15-3, 15-4) communication networks or combinations thereof. The communication network comprises one or more communication devices 17 (e.g. switches, routers, bridges, etc.) facilitating data transfer and may be private, public or combined. One or more communication networks (typically, private communication networks) may constitute a part of the intranet. The intranet resources (including client based resources, web-based resources, etc.) are predefined as belonging to the intranet. The intranet resources may be grouped in two or more logical groups (sub-networks) in accordance with different criterion. For example, the grouping may be provided in accordance with network architecture (e.g. resources connected by certain LAN) and/or business structure (e.g. resources related to a certain business unit) and/or business function (e.g. resources related to a certain application/business task) and/or level of user's trust and/or level of classified information, etc.

The data network may include also resources, other than intranet, by way of non-limiting example, Internet resources (other than web-based intranet resources); these resources may be grouped in one or more sub-networks 13-3.

A security gateway 18 is operatively coupled to the sub-network 13-1 and controls inbound and outbound traffic related to the sub-network and resources thereof. Similar, the security gateway 18 or other (not shown) security gateway(s) may control inbound and outbound traffic related to sub-network 13-2 and/or parts thereof. The security gateway may comprise, for example, one or more firewalls or routers with respective load balancers, intrusion detection/prevention systems, VPN devices and/or other equipment facilitating network and/or application security. The security gateway 18 operates in accordance with one or more rules controlling, at least, inbound and/or outbound traffic with regard to respective resources. These rules (including combinations and/or hierarchies thereof) are referred hereinafter as a rule-set. A single rule typically includes several attributes: source (IP address and/or port), destination (IP address and/or port), service type and appropriate action (e.g. to accept or to deny the respective traffic). The rule may also specify the writing of a log record, performing a network-address-translation, authentication and encryption etc. An attribute may be a range, e.g. a range of TCP ports, a range of IP addresses in a LAN defined by a mask, etc.

Communication events, i.e. events related to inbound and/or outbound traffic controlled by the security gateway, may be logged. Log recording is triggered by matching a certain rule, while the format of the log record(s) is determined by the log configuration specified in the policy and/or respective rule. The typical log record assigned to a rule comprises time and date of the recorded event, an identifier of the respective rule, event specification (e.g. the source and destination addresses of the access session, the name of service attempted, used protocol, source and designation ports, etc.), action taken, user, the security gateway that generated the log entry, etc. Log records may further comprise derivatives of information related to certain events (e.g. hit-count data). Log records may be accommodated in the security gateway and/or exported to other systems (e.g. security management block) via standard (e.g., syslog, SNMP) or proprietary (e.g., OPSEC) protocols.

The security gateway 18 is operatively connected to a security management block 19. The security management block may be fully or partly integrated with the security gateway or may be implemented in one or more stand-alone servers or integrated with other network resources. The security management block functions may include providing a backend for the policy editor GUI, monitoring the operation of the security gateway, storing the rule-set database and log database, reporting, etc. In certain embodiments the rule-set database and the log database (or respective parts thereof) may be accommodated in the security gateway itself.

In accordance with certain embodiments of the invention, the security gateway 18 and/or the security management block 19 are operatively connected to a rule-set generator 10 further detailed with reference to FIGS. 2-4. The rule-set generator may be fully or partly integrated with the security gateway and/or the security management block, or may be implemented in one or more stand-alone servers, or integrated with other network resources.

Note that the invention is not bound by the specific architecture described with reference to FIG. 1. Those versed in the art will readily appreciate that the invention is, likewise, applicable to any network architecture facilitating protection of data network resources in accordance with a rule-set installed at any suitable security gateway capable of controlling the respective traffic. The teachings of the present invention are applicable to any suitable security gateway enforcing a rule-set controlling respective traffic.

Figure 2:
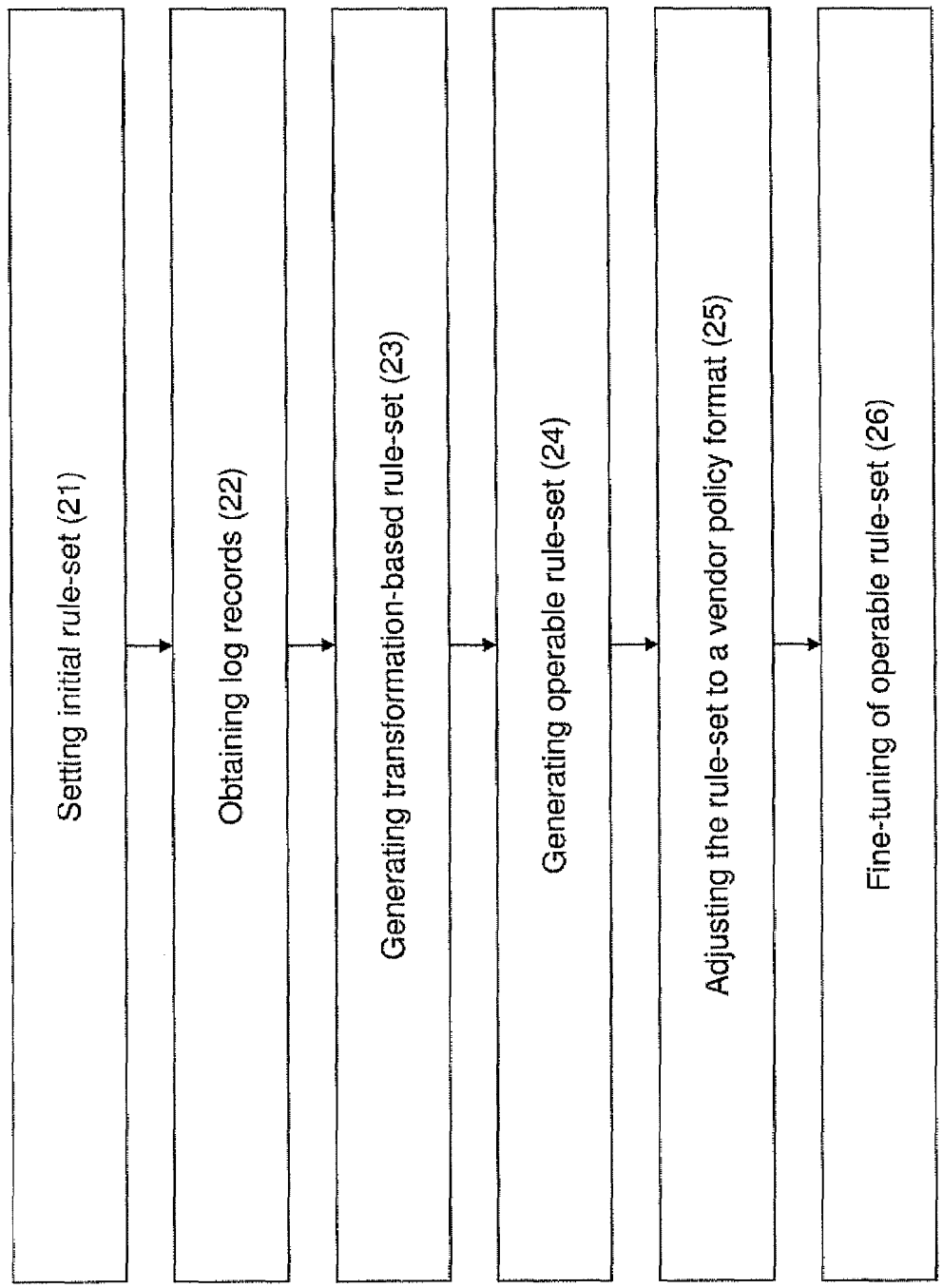
FIG. 2 illustrates a generalized flow diagram of configuring the security gateway in accordance with certain embodiments of the present invention.

Referring to FIG. 2, there is illustrated a generalized flow diagram of configuring the security gateway in accordance with certain embodiments of the present invention. The process starts with setting an initial rule-set (21). The term "initial rule-set" used in this patent specification should be expansively construed to include any combination of permissive and restrictive rules, and used in accordance with appropriate teachings of the present invention. Optionally the combination may consist of Accept-All-And-Log rule only. The initial rule-set may be related to all traffic or part thereof.

In certain embodiments of the invention this initial rule-set is related to all traffic controlled by the security gateway and comprises only one rule, this rule permitting any traffic between any data network resources; such initial permissive rule-set does not require prior knowledge of the data network resources. For example, the rule may be defined "Accept-All-And-Log", i.e. source, destination and service fields in the rule will be defined as "Any", an action field will be defined as "Accept" and all traffic events will be logged. By way of non-limiting example, such embodiments may be useful when configuring a new security gateway.

In other embodiments of the invention the initial rule-set may be related to a subset of the traffic to be controlled by the gateway. The rest of the traffic may be controlled in accordance with a pre-configured rule-set, a rule-set configured together or after setting the initial rule-set and/or not-controlled. By way of non-limiting example, such initial rule-set may comprise only one rule permitting traffic between specified resources (e.g. any traffic between resources connected by certain LAN, any traffic between resources within pre-defined groups of IP addresses, etc.), or a combination of permitting and restricting rules regulating certain types of traffic between certain resources. Such initial rule-set requires certain prior knowledge of the network, but still does not require detailed knowledge of the resources and topology. Such embodiments may be useful, for example, for configuring (first-time configuration or on-going maintenance) a rule-set related to traffic between two or more sub-networks characterized by IP address groups with unknown traffic patterns between them, adding additional rules to the pre-configured rule-set to support newly added physical and/or logical resources and groups thereof or new business connectivity requirements, refining the pre-configured rule-set, etc. By way of another non-limiting example, the permissive "Accept-All-And-Log" rule may be added as a last rule in the pre-configured rule-set. Such an embodiment may be useful, for example, for on-going refinement and maintenance of the pre-configured rule-set.

In certain embodiments of the invention, the security gateway is initially configured to operate, at least with regard to a part of the traffic, in accordance with said initial rule-set, and at least log records of respective operation are collected during a certain substantial period of time (e.g. 1 week, 1 month, etc.), and obtained (22) by the rule-generator 10 from the security gateway 18 and/or security management block 19.

In other embodiments of the invention the configuration of security gateway may be kept unchanged, and log records are collected during a certain substantial period of time, and obtained (22) by the rule-generator 10 from the security gateway 18 and/or security management block 19.

In other embodiments of the invention the rule generator 10 may be configured as a sniffer capable of monitoring and/or capturing inbound and outbound traffic with regard to resources of interest, to log respective communication events and to collect such log records during a certain substantial period of time.

The log records are collected until obtaining a sufficient amount of log records, this sufficient amount characterized, for example, by achieving predefined/configurable threshold(s), by terminating a predefined collection period, etc. One month may be a reasonable default value for many organizations. The duration of the collection period depends on intensity of traffic between involved network resources. There exists a tradeoff between the number of collected logs (and, accordingly, the duration of the collection period) and accuracy of the resulting rule base based on the gathered information. The duration of the collection period may be configurable in accordance with different criterion, e.g. the total number of collected logs, the number of logs collected per certain types of traffic and/or service and/or destination/source addresses, etc. In certain embodiments of the invention the duration of the collection period may be defined in accordance with a certain threshold, and operation of the security gateway under the initial rule-set will be continued until said threshold is achieved. The threshold may be configured, for example, as a total number of collected respective logs (e.g. 5 million logs), a total number of collected respective logs of some types of traffic (especially for a rare traffic e.g. a backup restore service), a total number of collected respective logs and relationship thereof of different types of traffic (e.g. 5% of certain traffic among not less than 1 million collected log records), total number of collected logs in relation to traffic per pre-configured rule-set, etc.

The collecting period may be a period prior to the security gateway operation and/or during the operation (e.g. on an on-going basis for refining the rule-base, amending rules to reflect new connectivity requirements, etc.).

The obtained log records are transformed (23) into respective rules in accordance with the initial rule-set, wherein source, destination and service fields in each rule correspond to source, destination and service values in respective collected log record, and the action in all rules is defined as "Accept". The resulting rules are referred to hereinafter as transformation-based rules. The transformation is provided only with respect to the log records related to communication events corresponding to the initial rule-set. By way of non-limiting example, if the initial rule-set is related to a part of the traffic, and the obtained log records are related to all traffic, the transformation will be provided only for the log records having the same source, destination and service fields as defined in the initial rule-set.

Steps (22) and (23) may be implemented in different manners. For example, the log records may be accumulated during the collection period and be transformed into respective rules upon collection of a sufficient amount of log records; alternatively, each collected log record may be transformed into a rule substantially when obtained, and the respective rules may be accumulated during the collection period; etc. Since the log formats of security gateway vendors may be different, in certain embodiments of the invention the log records may be normalized before transformation, i.e. converted from a specific security gateway vendor's format to a standardized internal representation.

As will be farther detailed with reference to FIG. 3, the obtained transformation-based rules are used for generation (24) of an operable rule-set, i.e. a rule-set capable of being put into practice for regular operation of the security gateway. In certain embodiments of the invention the generated rule-set may replace a respective part of a pre-configured rule-set and/or amend the pre-configured rule-set with new rules related to new resources. The generated operable rule-set may be further adjusted (25) in accordance with policy format used by certain security gateway vendors. Optionally, the operations (23)-(25) may be repeated using the generated operable rule-set instead of the initial permissive rule-set, thus, if necessary, providing fine-tuning (26) for the generated operable rule-set. If the operable rule-set is added to a pre-configured rule set (as an addition and/or replacement), the fine-tuning may further include identification and special marking of rules that contradict rules in the pre-configured rule-set. Adding the operable rule-set to the pre-configured rule-set may further comprise optimization of the resulting rule-set.

Those versed in the art will readily appreciate that the invention is, likewise, applicable to VPNs and authentication rules, wherein the initial rule-set will be defined, respectively, with regard to VPN/authentication rule.

Figure 3:
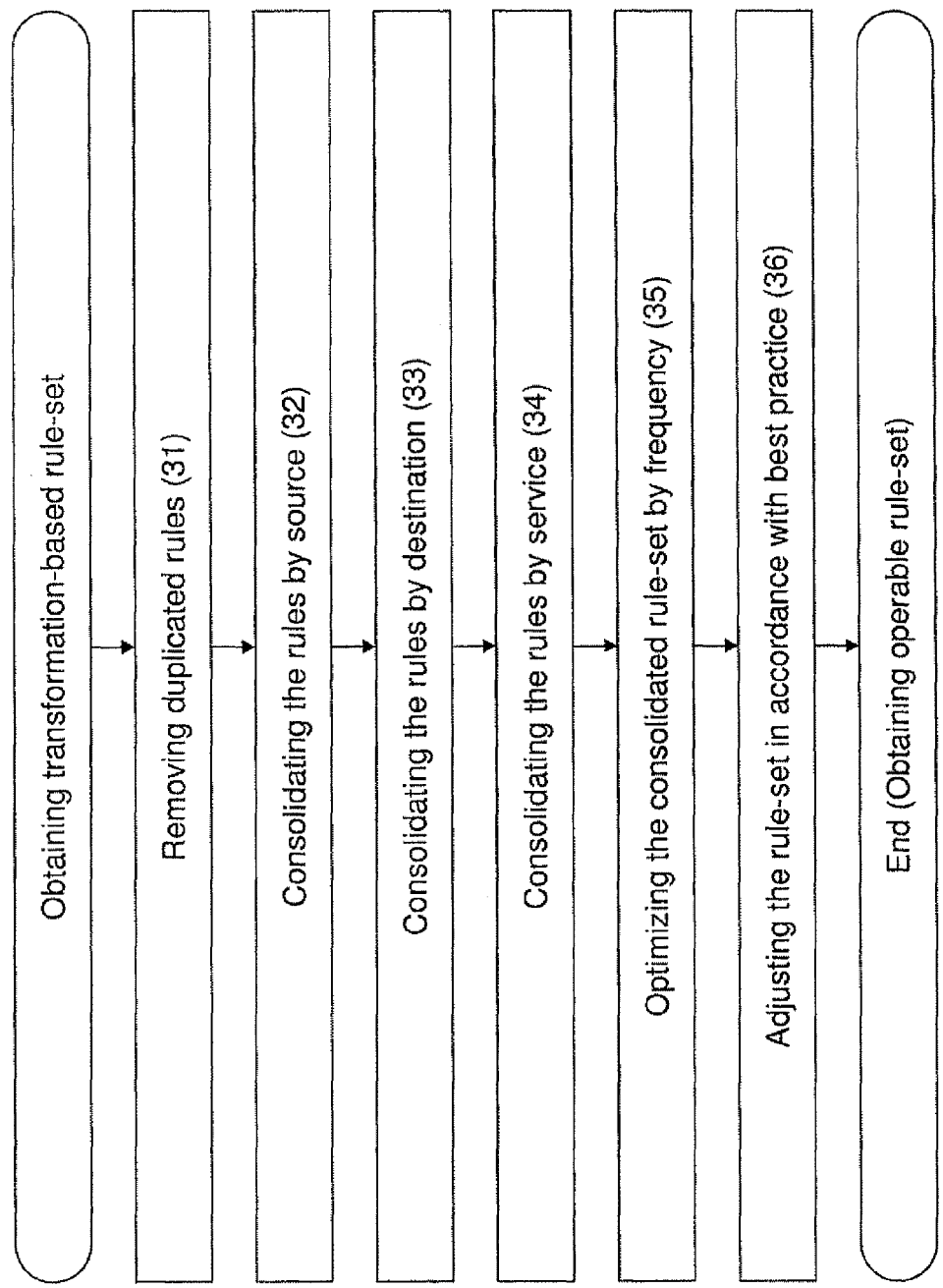
FIG. 3 illustrates a generalized flow diagram of generating a rule-set in accordance with certain embodiments of the present invention.

Referring to FIG. 3, there is illustrated a generalized flow diagram of the process of generating (24) the operable rule-set. As was detailed with reference to FIG. 2, the configuration process includes obtaining the transformation-based rule-set for further processing. The processing starts with identifying and removing duplicate rules (31) among the transformation-based rules. Two or more rules are considered to be duplicated if they are identical, i.e. they have the same source, destination and service fields. In practice, removing the duplicate rules may reduce the number of transformation-based rules to be analyzed by several orders of magnitude. Each remaining rule is provided with an initial hit count characterizing the number of respective duplicated rules among the transformed rules. Table 1 illustrates, by way of non-limiting example, a fragment of the transformation-based rule-set after removing the duplicated rules.

TABLE 1

| Source | Destination | Service | Action | Initial Hit Count |
|---|---|---|---|---|
| 192.168.1.100 | 192.168.3.5 | HTTP | Accept | 30 |
| 192.168.1.32 | 192.168.5.8 | HTTP | Accept | 20 |
| 192.168.1.33 | 192.168.5.9 | HTTP | Accept | 35 |
| 192.168.1.34 | 192.168.5.8 | HTTP | Accept | 12 |
| 192.168.1.35 | 192.168.5.8 | HTTP | Accept | 44 |
| 192.168.1.101 | 192.168.3.5 | HTTP | Accept | 13 |
| 192.168.1.34 | 192.168.5.9 | HTTP | Accept | 7 |
| 192.168.1.32 | 192.168.5.9 | HTTP | Accept | 60 |
| 192.168.1.35 | 192.168.5.9 | HTTP | Accept | 14 |
| 192.168.1.33 | 192.168.5.8 | HTTP | Accept | 45 |

The remaining rules are further consolidated by source (32), destination (33) and service (34) respectively. The operations (32)-(34) may be provided in whichever order.

Consolidation by source includes the following operations:
identifying the rules with same first values in destination fields and same second values in service fields;
identifying among these rules the rules with third values in the source fields fitting certain criterion (e.g. consecutive values and/or values belonging to a group characterized by a predefined criterion, etc.);
combining the source fields of the identified rules as a range of respective third values and/or a derivative of said range (e.g. sub-network);
aggregating the identified rules in one rule with the first value in the destination field, second value in the service field and the range of respective third values in the source field;
amending the hit counter, summarizing initial hit counters in the aggregated rules.

The consolidation of rules by destination and by service is provided in a similar manner. The consolidation process is repeated until all possible consolidation by all fields are provided, thus giving rise to a consolidated rule-set.

Table 2 illustrates, by way of non-limiting example the rule-set illustrated in Table 1 and farther consolidated by source.

TABLE 2

| Source | Destination | Service | Action | Hit Count |
|---|---|---|---|---|
| Sub-Network1: Address 192.168.1.100 NetMask 255.255.255.254 | 192.168.3.5 | HTTP | Accept | 43 |
| Sub-Network 2: Address 192.168.1.32 NetMask 255.255.255.252 | 192.168.5.8 | HTTP | Accept | 121 |
| Sub-Network2: Address 192.168.1.32 NetMask 255.255.255.252 | 192.168.5.9 | HTTP | Accept | 126 |

Table 3 illustrates, by way of non-limiting example, the rule-set illustrated in Table 2 and further consolidated by destination.

TABLE 3

| Source | Destination | Service | Action | Hit Count |
|---|---|---|---|---|
| Sub-Network1: Address 192.168.1.100 NetMask 255.255.255.254 | 192.168.3.5 | HTTP | Accept | 43 |
| Sub-Network2: Address 192.168.1.32 NetMask 255.255.255.252 | Sub-Network3: Address 192.168.5.8 NetMask 255.255.255.254 | HTTP | Accept | 247 |

The IP addresses in the source and the destination fields in the examples illustrated in Tables 1, 2 and 3 were consecutive, and the corresponding ranges of source and destination values were combined into sub-networks by applying appropriate subnet masks.

However, in many actual cases the values in the source and/or the destination fields to be combined for rules consolidation are not consecutive. Table 4 illustrates, by way of non-limiting example, a fragment of the transformation-based rule-set (after removing the duplicated rules) having the same destination and service values, while the source values are not consecutive.

TABLE 4

| Source | Destination | Service | Action | Hit Count |
|---|---|---|---|---|
| 192.168.1.0 | 192.168.5.8 | FTP | Accept | 35 |
| 192.168.1.2 | 192.168.5.8 | FTP | Accept | 23 |
| 192.168.1.5 | 192.168.5.8 | FTP | Accept | 18 |
| 192.168.1.7 | 192.168.5.8 | FTP | Accept | 13 |

There are certain advantages of combining a range of IP addresses in a sub-network, e.g. for simplification and reliability of network management and, in particular, for effective network traffic control. However, combining a non-consecutive range of source and/or destination addresses in a subnet will require filling the "gaps" between the IP addresses (i.e. defining missing consecutive addresses as trusted); this may open security breaches and pose a security threat. In accordance with certain embodiments of the present invention, there is proposed to use, when consolidating the rules, a configurable Subnet Threshold Parameter (STM) as a criterion for combining a range of IP addresses in a subnet. The STM is defined as a ratio of the largest allowable gap in the network IP addresses to a number of existing addresses in a resulting sub-network. This parameter characterizes the desired balance between the compactness of the rule set and the required security level and may be configured by Security Manager for the entire intranet and/or parts thereof. For example, if STM is configured as equal to 0%, the range of source values in the rule-set illustrated in Table 4 can not be consolidated into any sub-network. If STM is configured as equal to 25%, the rules illustrated in Table 4 may be consolidated into two rules with regard to two sub-networks as illustrated in Table 5, and if STM is configured as equal to 40%, the consolidation may result in 1 rule with regard to one sub-network as illustrated in Table 6.

TABLE 5

| Source | Destination | Service | Action | Hit Count |
|---|---|---|---|---|
| Network1:<br>Address<br>192.168.1.0<br>NetMask<br>255.255.255.252 | 192.168.5.8 | FTP | Accept | 58 |
| Network2:<br>Address<br>192.168.1.4<br>NetMask<br>255.255.255.252 | 192.168.5.8 | FTP | Accept | 31 |

TABLE 6

| Source | Destination | Service | Action | Hit Count |
|---|---|---|---|---|
| Network3:<br>Address<br>192.168.1.0<br>NetMask<br>255.255.255.248 | 192.168.5.8 | FTP | Accept | 89 |

When consolidating by service (34), the aggregation may be provided if the service belongs to a predefined group of services (e.g. HTTP and HTTPS or different types of ICMP).

By way of non-limiting example, in certain practical embodiment of the invention there were obtained 5,000,000 log records farther transformed into respective rules. The number of rules was reduced to 28,000 after eliminating the duplicate rules, there are rules. The rule-base consisting of 2200 rules was obtained after the consolidation by source, destination and service. Further optimization by combining a range of non-consequent IP addresses in subnets has provided the following results depending on STM parameter:

| STM | Rule-Base size |
|---|---|
| 0% | 2200 |
| 20% | 1328 |
| 40% | 259 |
| 80% | 78 |

The value STM=40% was considered in this non-limiting example as providing a balance between the rule-base compactness and preventing security breaches requirements.

Certain embodiments of the invention may support more complicated transformation and consolidation processes, some of them requiring certain prior knowledge about the network resources. For example, in certain networks there may be multiple ports associated with the same source and/or destination IP address, prior knowledge of these port groups facilitates further rule-set optimization. For example, in a case when certain e-mail clients use multiple ports to contact a mail server, there will be a plurality of obtained log records having the same source, the same destination IP but different destination ports. Accordingly, if the generating rule-set is designated to a secure gateway supporting rules with multiple ports, the respective plurality of rules in the transformation-based rule-set will be consolidated into one rule. As another example, prior knowledge of web-based servers/application(s) allows to consolidate multiple rules (e.g. as "user X can browse site S1", "user X can browse site S2", "user Y can browse site S3" etc.) into a web-browsing rule with regard to a group of sites).

The consolidated rule-set may be put into practice for regular operation of the security gateway. Optionally, before putting into practice, the obtained consolidated rule-set may be further optimized by reordering the rules in accordance with their hit count in the consolidated rule-set (35), wherein the more frequent rules are put higher in the rule table. Table 7 illustrates, by way of non-limiting example, the consolidated rule-set illustrated in Table 3 further optimized by frequency.

TABLE 7

| Source | Destination | Service | Action | Count |
|---|---|---|---|---|
| Sub-Network2:<br>Address<br>192.168.1.32<br>NetMask<br>255.255.255.252 | Sub-Network3:<br>Address<br>192.168.5.8<br>NetMask<br>255.255.255.254 | HTTP | Accept | 247 |
| Sub-Network1:<br>Address<br>192.168.1.100<br>NetMask<br>255.255.255.254 | 192.168.3.5 | HTTP | Accept | 43 |

In all the IP manipulations, network address translation (NAT) may be taken into account. By way of non-limiting example, the described operations may be provided in a similar manner over translated source/destination addresses and port numbers appearing in the logs so as to build appropriate rule-set. The security gateway will use operate in accordance with this rule-set and use its respective NAT mechanism to control the actual traffic.

Optionally, the consolidated rule-set may be further adjusted according to vulnerability black lists, organizational policies, best practices, regulations, and other standards for security gateways (36). This operation may include, for example, amending the consolidated rule-set by non-generated white list rules (i.e. the rules which should always present in the rule base), special marking of the generated rules, etc. A non-limiting example of a white list rule is a "cleanup rule"—the last rule in the rule-set saying "drop all that is not explicitly allowed". This rule may be marked by a special sign to indicate that it was added to the rule-set in order to conform to the known best practice. On the other hand, some of generated rules may be marked as a priori dangerous in accordance with the best practice (e.g. a rule allowing all types of ICMP traffic or potentially conflicting with the organization's policy). If the newly-added consolidated rule-set comprises some rules that contradict pre-configured rules, these rules may also be marked. Later a security manager may decide whether to leave such rules in the rule base. In certain embodiments of the invention such potentially dangerous rules may be excluded from the consolidated rule-set.

Tables 8 and 9 illustrate non-limiting example of tightening the pre-configured rules in accordance with certain embodiments of the present invention. Table 8 illustrates a rule in a pre-configured rule set.

TABLE 8

| Source | Destination | Service | Action |
|---|---|---|---|
| src1, src2 | dst1, dst2 | FTP | Accept |

If, in an exemplary case, the analysis of the obtained records shows that all the actual traffic goes only from src1 to dst2 and from src2 to dst1, the original rule may be split into two rules as shown in Table 9. Accordingly, the rule base will be tightened, thus eliminating potential security holes.

TABLE 9

| Source | Destination | Service | Action |
|---|---|---|---|
| src1 | dst2 | FTP | Accept |
| src2 | dst1 | FTP | Accept |

The rule generation process described above generates not only the rule set, but also other firewall entities, such as network objects. The user may study the obtained objects and compare them to the actual networks in the organization.

Figure 4:
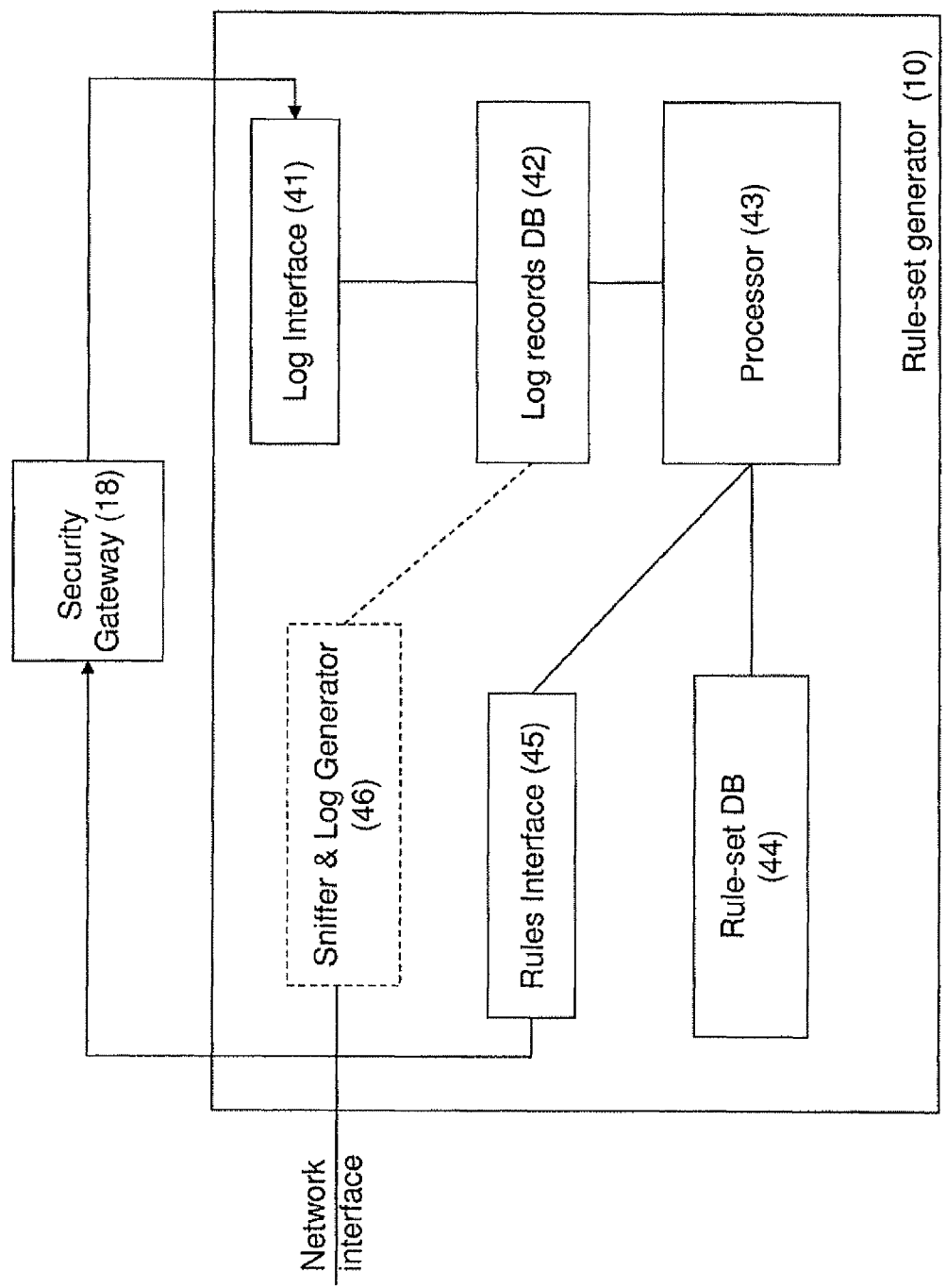
FIG. 4 illustrates a generalized functional block diagram of a rule-set generating tool in accordance with certain embodiments of the present invention.

Referring to FIG. 4, there is illustrated a generalized block-diagram of a rule-set generator in accordance with certain embodiments of the present invention. The rule-set generator (10) may be implemented as a standalone platform or integrated, fully or partly, with other network resources (e.g. firewall or other security gateway, security management module, etc.). The rule-set generator comprises a processor (43) operatively coupled to a log interface (41). The log interface is configured to obtain log records generated by the security gateway and to forward them to the processor and/or to a log records database (42) operatively coupled to the processor. The processor 43 is configured to provide necessary processing of the obtained log records and to generate an operable rule-set in accordance with operations detailed with reference to FIGS. 2-3, to forward, if necessary, the obtained information and/or derivatives thereof for accommodation in one or more data repositories operatively coupled to the processor, and to provide necessary data management. The data repositories may include the log records DB (42), a rule-set DB (44), a best-practice repository (not shown) and others. The processor is further operatively coupled to a rules interface (45). The rules interface is configured to forward the initial rule-set and operative rule-set to the security gateway. Optionally, the rule-set generator may comprise a sniffer (46) operatively coupled to the log DB and capable of monitoring and/or capturing the network traffic to be controlled by the security gateway and of generating respective log records as required in accordance with operation detailed with reference to FIGS. 2-3.

Those skilled in the art will readily appreciate that the invention is not bound by the configuration of FIG. 4; equivalent and/or modified functionality may be consolidated or divided in another manner and may be implemented in software, firmware, hardware, or any combination thereof Those skilled in the art will also readily appreciate that the data repositories may be consolidated or divided in other manner; some of these databases may be shared with other systems, including 3rd party equipment.

It is to be understood that the invention is not limited in its application to the is details set forth in the description contained herein or illustrated in the drawings. The invention is capable of other embodiments and of being practiced and carried out in various ways. It should be noted that the invention is not bound by the specific algorithm of processing or specific structure. Those versed in the art will readily appreciate that the invention is, likewise, applicable to any other processing or presentation with equivalent and/or modified functionality which may be consolidated or divided in another manner.

It will also be understood that the invention further contemplates a machine-readable memory tangibly embodying a program of instructions executable by the machine for executing the method of the invention.

Those skilled in the art will readily appreciate that various modifications and changes can be applied to the embodiments of the invention as hereinbefore described without departing from its scope, defined in and by the appended claims.

The invention claimed is:

1. A method of configuring a security gateway by means of a processor operatively coupled to a memory, the method comprising:
   a) accommodating in the memory an initial rule-set;
   b) obtaining log records of communication events corresponding to the initial rule-set to obtain a sufficient amount of log records;
   c) generating, with the processor, a transformation-based rule-set by transforming the obtained log records into respective rules, wherein each obtained log record is transformed into a respective rule with source, destination and service fields corresponding to source, destination and service values in the transformed obtained log record, and wherein an action in the rule is defined as "Accept"; and
   d) generating an operable rule-set by processing, with the processor, the transformation-based rule-set, wherein generating the operable rule-set by processing of transformation-based rule-set comprises:
   a) identifying and removing duplicate rules among the transformation-based rules, thus giving rise to remaining rules, wherein each remaining rule is provided with an initial hit count characterizing a number of respective duplicated rules before removing; and
   b) consolidating the remaining rules by source, destination and service respectively, thus giving rise to consolidated rules, wherein each consolidated rule is provided with a consolidated hit count calculated by summarizing the initial hit counts of the rules consolidated in the respective consolidated rule.

2. The method of claim 1 wherein the initial rule-set is related to all traffic to be controlled by the security gateway and consists of only one rule, the one rule permitting any traffic between any data network resources.

3. The method of claim 1 wherein the initial rule-set is related to a part of the traffic to be controlled by the security gateway.

4. The method of claim 1 wherein the initial rule-set is integrated with a pre-configured rule-set.

5. The method of claim 4 wherein the integration is provided by adding an "Accept-All-And-Log" rule as a last rule to the pre-configured rule-set.

6. The method of claim 1 wherein at least part of the obtained log records are generated by the security gateway which is configured to control at least part of traffic in accordance with said initial rule-set.

7. The method of claim 1 wherein at least part of the log records is obtained by sniffing the traffic to be controlled by the security gateway and logging respective communication events.

8. The method of claim 1 wherein the sufficient amount of log records is characterized by achieving a certain threshold.

9. The method of claim 1 wherein the sufficient amount of log records is characterized by terminating a certain substantial collection period.

10. The method of claim 1 wherein the obtained log records are normalized before transforming.

11. The method of claim 1 further comprising:
adjusting the operable rule-set in accordance with a policy format used by a certain security gateway vendor.

12. The method of claim 1 further comprising:
repeating operations b)-d) while using the generated operable rule-set instead of the initial rule-set so as to generate a refined operable rule-set.

13. The method of claim 1 wherein the consolidated rule-set is further optimized by reordering the rules in accordance with each rule's consolidation hit count, wherein more frequent rules are put higher in a rule table.

14. The method of claim 1 wherein the consolidated rule-set is further adjusted according to at least one criterion selected from a group comprising: vulnerability black lists, organizational policies, best practices, recommended white lists, regulations, and standards for security gateways.

15. The method of claim 1 wherein consolidating comprises combining a range of IP addresses of respective sources and/or destinations in a sub-network.

16. The method of claim 15 wherein said range of IP addresses is non-consecutive and combining in a sub-network is provided in accordance with a Subnet Threshold Parameter (STM) defined as a ratio of a largest allowable gap in network IP addresses to a number of addresses in a resulting sub-network.

17. A rule-set generator comprising:
a) a first memory configured to accommodate an initial rule-set to be used for configuring a security gateway;
b) a second memory configured to accommodate log records of communication events corresponding to the initial rule-set;
c) a processor operatively coupled to the first repository and the second repository, the processor being configured to:
    i) generate a transformation-based rule-set by transforming said accommodated log records into respective rules, wherein each obtained log record is transformed into a respective rule with source, destination and service fields corresponding to source, destination and service values in the transformed log record, and wherein an action in the rule is defined as "Accept"; and
    ii) generate an operable rule-set by processing the transformation-based rule-set, wherein
the processor is further configured to generate the operable rule-set by processing the transformation-based rule-set as follows:
a) to identify and remove duplicate rules among the transformation-based rules, thus giving rise to remaining rules, wherein to provide each remaining rule with an initial hit count characterizing a number of respective duplicated rules before removing; and
b) to consolidate the remaining rules by source, destination and service respectively, thus giving rise to consolidated rules, wherein to provide each consolidated rule with a consolidated hit count calculated by summarizing the initial hit counts of the rules consolidated in the respective consolidated rule.

18. The rule-set generator of claim 17 further comprising:
a sniffer operatively coupled to the second memory and capable of (1) capturing network traffic to be controlled by the security gateway and (2) generating respective log records.

19. The rule-set generator of claim 17 wherein the rule-set generator is at least partly integrated with the security gateway.

20. The rule-set generator of claim 17 wherein the initial rule-set is related to all traffic to be controlled by the security gateway and consists of only one rule, the one rule permitting any traffic between any data network resources.

21. The rule-set generator of claim 17 wherein at least part of the log records accommodated in the second memory is generated by the security gateway which is configured to control at least part of traffic in accordance with said initial rule-set.

22. The rule-set generator of claim 17 wherein the consolidation comprises combining a range of IP addresses of respective sources and/or destinations in a sub-network.

23. The rule-set generator of claim 22 wherein said range of IP addresses is non-consecutive and combining in a sub-network is provided in accordance with a Subnet Threshold Parameter (STM) defined as a ratio of a largest allowable gap in network IP addresses to a number of addresses in a resulting sub-network.

24. The method of claim 1, wherein generating the operable rule-set by processing the transformation-based rule-set comprises:
consolidating at least part of the rules in the transformation-based rule-set by combining a range of IP addresses of at least one of respective sources and destinations in a sub-network, wherein
said range of IP addresses is non-consecutive and combining in a sub-network is provided in accordance with a Subnet Threshold Parameter (STM) defined as a ratio of a largest allowable gap in network IP addresses to a number of addresses in a resulting sub-network.

25. The rule-set generator of claim 17, wherein the processor is further configured to consolidate at least part of the rules in the transformation-based rule-set by combining a range of IP addresses of at least one of respective sources and destinations in a sub-network, wherein
said range of IP addresses is non-consecutive and combining in a sub-network is provided in accordance with a Subnet Threshold Parameter (STM) defined as a ratio of a largest allowable gap in network IP addresses to a number of addresses in a resulting sub-network.

26. A computer program product comprising a non-transitory computer readable medium storing computer readable program code for a computer generating a rule-set, the computer program product comprising:
computer readable program code for causing the computer to accommodate in a memory an initial rule-set;
computer readable program code for causing the computer to obtain log records of communication events corresponding to the initial rule-set so as to obtain a sufficient amount of log records;
computer readable program code for causing the computer to generate a transformation-based rule-set by transforming the obtained log records into respective rules, wherein each obtained log record is transformed into a respective rule with source, destination and service fields corresponding to source, destination and service values in the transformed obtained log record, and wherein an action in the rule is defined as "Accept"; and computer readable program code for causing the computer to generate an operable rule-set by processing the transformation-based rule-set, wherein the computer readable program code is further configured to cause the computer to generate the operable rule-set by processing the transformation-based rule-set as follows:

a) to identify and remove duplicate rules among the transformation-based rules, thus giving rise to remaining rules, wherein to provide each remaining rule with an initial hit count characterizing a number of respective duplicated rules before removing; and b) to consolidate the remaining rules by source, destination and service respectively, thus giving rise to consolidated rules, wherein to provide each consolidated rule with a consolidated hit count calculated by summarizing the initial hit counts of the rules consolidated in the respective consolidated rule.

* * * * *